United States Patent
Tanski

(10) Patent No.: US 11,435,464 B2
(45) Date of Patent: Sep. 6, 2022

(54) LAYERED VIRTUAL ARRAY FOR MIMO PROCESSING

(71) Applicant: SRC, Inc., North Syracuse, NY (US)

(72) Inventor: Richard G. Tanski, East Orange, NJ (US)

(73) Assignee: SRC, Inc., North Syracuse, NY (US)

( * ) Notice: Subject to any disclaimer, the term of this patent is extended or adjusted under 35 U.S.C. 154(b) by 97 days.

(21) Appl. No.: 16/719,109

(22) Filed: Dec. 18, 2019

(65) Prior Publication Data

US 2020/0191931 A1 Jun. 18, 2020

Related U.S. Application Data

(60) Provisional application No. 62/781,375, filed on Dec. 18, 2018.

(51) Int. Cl.
*G01S 13/02* (2006.01)

(52) U.S. Cl.
CPC ....... *G01S 13/02* (2013.01); *G01S 2013/0245* (2013.01)

(58) Field of Classification Search
None
See application file for complete search history.

(56) References Cited

U.S. PATENT DOCUMENTS

2019/0310360 A1* 10/2019 Hershkowitz ............ G01S 7/03

* cited by examiner

*Primary Examiner* — Whitney Moore
(74) *Attorney, Agent, or Firm* — Bond Schoeneck & King, PLLC; George McGuire

(57) ABSTRACT

Processing of MIMO radar data generated from overlapped MIMO arrays. The method of virtualizing (basebanding the MIMO phase centers) allows for processing without the need to omit content/information/energy from overlapped virtual elements.

3 Claims, 4 Drawing Sheets

LAYERED VIRTUAL ARRAY FOR MIMO PROCESSING

CROSS-REFERENCE TO RELATED APPLICATION

The present application relates and claims priority to U.S. Provisional Application No. 62/781,375, filed Dec. 18, 2018, the entirety of which is hereby incorporated by reference.

FIELD OF THE INVENTION

The present disclosure is directed generally to the processing of data collected from a generalized MIMO array that contains overlapped virtual phase centers.

BACKGROUND

The problem at hand that led to the proposed solution deals with the processing of data collected from a generalized MIMO array that contains overlapped virtual phase centers. When virtual phase centers are overlapped previous methods have removed and/or merged the data/energy from these phase centers. The resulting processing, specifically through keystone processing, results in poor results as the energy across the virtual array is not properly normalized. In trying to normalize the array energy other methods result in loss of information or energy.

During the processing of a MIMO array, it is generally necessary to keystone the data with respect to the array. This will be needed for data with high bandwidth, fast targets, and long CPIs as the target can move over many range cells over a dwell/CPI. Array keystoning is intended to solve the issue of change in beam shifts over frequency, which is worse over large bandwidths. Further, it allows for phase-only steering to any unambiguous angle for wideband signals.

Thus, when array keystoning is applied to data that does not have consistent channel magnitudes for a given range and pulse the interpolation will fail. The resulting data, post-keystone, will no longer be representative of the data and therefore will be a loss of gain and sine loss. FIG. 1 graphically illustrates an example of the interpolation causing an issue.

Accordingly, there is a need in the art for the processing of data collected from a MIMO array with overlapped phase centers.

SUMMARY

The present disclosure is directed to a process implemented in a RADAR system to virtualize (basenand) a generalized MIMO array. The MIMO array is virtualized in such a way that overlapped virtual phase centers can be treated independently, thus resulting in all available energy/information being utilized. The method creates N layers of virtual arrays, where N is the maximum number of contributions (overlapped virtual phase centers) across the MIMO array for any given virtual phase center. The resulting N virtual arrays are then considered independent virtual arrays that are maximally normalized without the need to modify the data. The N virtual arrays can then be passed through additional processing methods that require a well normalized array, such as keystone processing. Once all processing is completed the resulting N virtual arrays can be simply recombined or summed to form a single virtual array with all processing applied.

According to an aspect is a method for processing data from a MIMO radar array having at least two phase centers, comprising the step of: creating at least two virtual layers each having a phase center and which collectively represent the full width of the MIMO radar array and each layer contains only one contribution for a given virtual phase center; performing keystone processing to each virtual layer; and combining each of the virtual layers.

This and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

An aspect of the invention allows for the processing of data collected from a MIMO array with overlapped phase centers. The present disclosure describes a processing method to virtualize a MIMO array that contains overlapped virtual phase centers. The process described by the technical documentation associated with the invention allows for processing to be applied that require a relatively consistent responses across the array, such as keystone processing.

Figure 1:
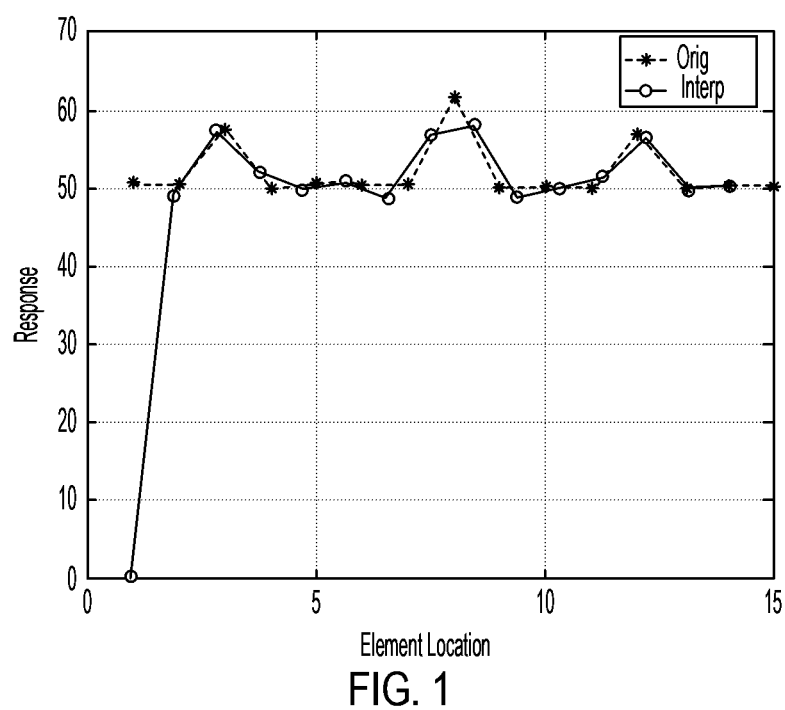
FIG. 1 is a graph of a prior art interpolation of response versus element locations in a MIMO array.
Figure 2:
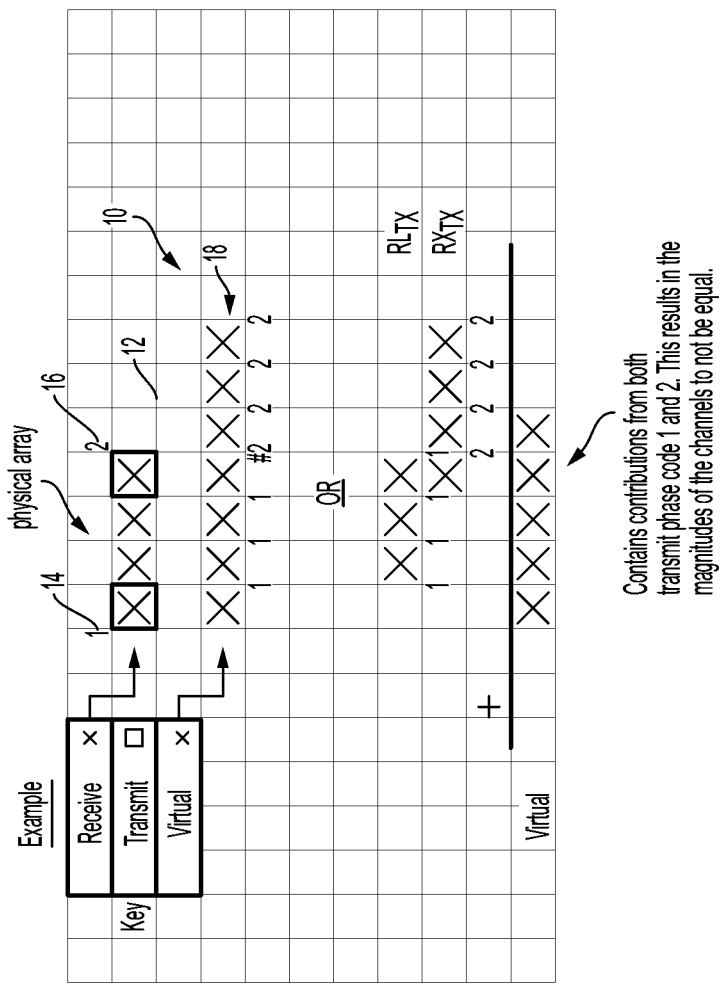
FIG. 2 is a schematic representation of a virtualized MIMO array, in accordance with an embodiment.

Referring to FIG. 2, in one embodiment, is a schematic representation of an array 10 comprising a physical array 12, having first and second phase centers 14 and 16, and a virtual array 18. Because there will be some data from a given channel that will overlap, the data was typically summed together. In the physical array 12 having the two phase centers 14 and 16, the representation in FIG. 1 shows the contributions for both transmit phase centers 14 and 16 resulting in magnitudes of the channels that are not equal.

Figure 3:
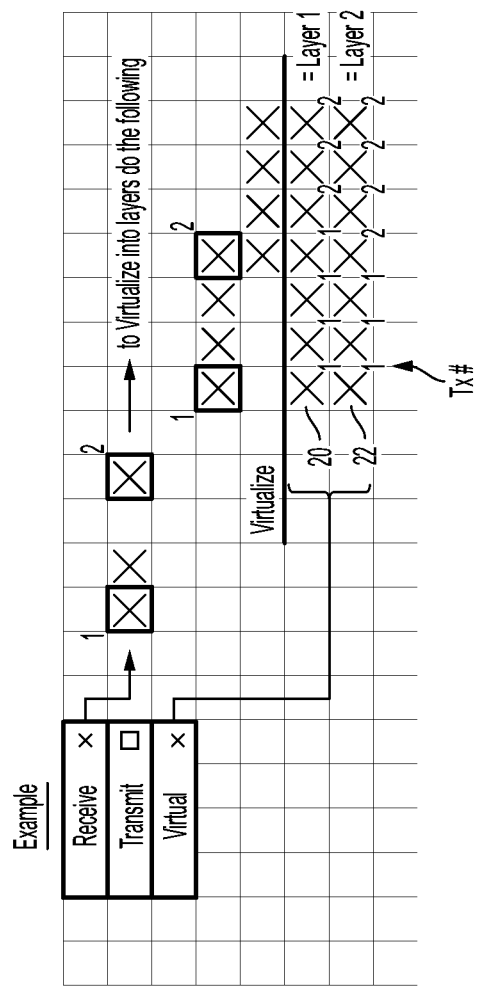
FIG. 3 is a schematic representation of a virtualized MIMO array having a series of virtual layers, in accordance with an embodiment.

Referring to FIG. 3, schematically it is shown that a series of layers that represent the full width MIMO array but only contain (at least and at most) one contribution for any given virtual phase center. In the example provided in FIG. 3 first and second layers 20, 22, are created which allows for the relative magnitude between channels to be maintained. This permits keystoneing to perform as expected and no loss in SINE is observed.

Figure 4:
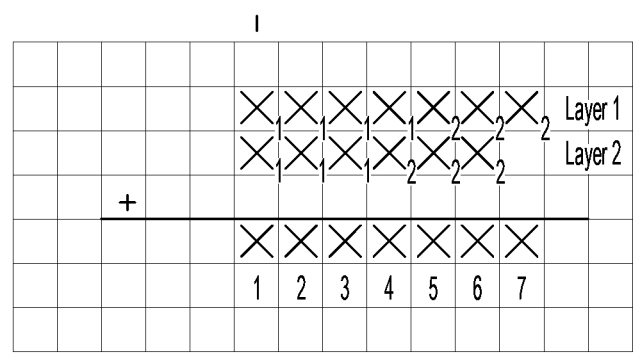
FIG. 4 is a schematic representation of a virtualized MIMO array having a series of virtual layers that have been summed/combined, in accordance with an embodiment

In addition, the virtual layering exemplified in FIG. 3 also permits simple summing/combining; because each layer is created using known transmit and receive phase center and keystone processing, the layers can simply be added together as represented in FIG. 4. In regard to the example illustrated in FIG. 4, the channel index numbers 1, 2, 3, 4, 5, 6 and 7 are simply the unique channel representing the layer (1, 2, 3 are channels 1, 2 and 3 from transmit phase center 1, while 5, 6, 7 are channels 2, 3, 4 from transmit phase center 2.) For virtual channel 4, the summing is the combination of channel 4 from transmit channel 1 and channel 1 from transmit channel 2 since they are collocated in the virtual arrays for their given layer.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for processing Multiple Input Multiple Output (MIMO) radar data, comprising:
   providing a MIMO radar array having a physical array with at least two overlapped phase centers and a virtual array for receiving data in a plurality of channels;
   creating at least two virtual layers in the virtual array, with each virtual layer having a virtual phase center and only one contribution for the virtual phase center such that the relative magnitude between the plurality of channels is maintained for the overlapped phase centers;
   performing keystone processing to each virtual layer; and
   combining each of the virtual layers to form a single virtual array without any loss of gain and sine.

2. The method of claim 1, wherein the first the step of creating at least two virtual layers in the virtual array comprises creating as many virtual layers as the number of overlapped phase centers.

3. The method of claim 1, further comprising the step of maximally normalizing the at least two virtual layers in the virtual array prior to performing keystone processing.

* * * * *